United States Patent [19] [11] Patent Number: 5,310,571
Meadows [45] Date of Patent: May 10, 1994

[54] CHEMICAL TREATMENT TO IMPROVE OXYGEN PERMEABILITY THROUGH AND PROTEIN DEPOSITION ON HYDROPHILIC (SOFT) AND RIGID GAS PERMEABLE (RGP) CONTACT LENSES

[75] Inventor: David Meadows, Mission Viejo, Calif.

[73] Assignee: Allergan, Inc., Irvine, Calif.

[21] Appl. No.: 938,937

[22] Filed: Sep. 1, 1992

[51] Int. Cl.⁵ .............................................. G02C 7/04
[52] U.S. Cl. .................................... 427/2; 427/255.1; 351/160 H; 525/937; 523/107
[58] Field of Search .................. 427/2, 248.1, 255.1; 351/160 R, 160 H; 523/106, 107; 525/937

[56] References Cited

U.S. PATENT DOCUMENTS

| | | | |
|---|---|---|---|
| 4,076,916 | 2/1978 | Lagow | 526/43 |
| 4,144,374 | 3/1979 | Lagow et al. | 428/334 |
| 4,312,575 | 1/1982 | Peyman et al. | 351/160 H |
| 4,491,653 | 1/1985 | McGinniss et al. | 525/356 |
| 4,540,761 | 9/1985 | Kawamura et al. | 526/245 |
| 4,687,708 | 8/1987 | Batzar | 428/339 |
| 4,743,419 | 5/1988 | Bierschenk | 264/83 |
| 4,828,585 | 5/1989 | Chiao | 55/16 |
| 4,933,406 | 6/1990 | Anan et al. | 526/245 |
| 4,954,586 | 9/1990 | Toyoshima et al. | 526/245 |
| 4,990,582 | 2/1991 | Salamone | 526/245 |
| 5,091,204 | 2/1992 | Ratner et al. | 427/2 |
| 5,151,183 | 9/1992 | Sepath et al. | 210/500.41 |
| 5,194,556 | 3/1993 | Mueller et al. | 528/28 |

Primary Examiner—Shrive Beck
Assistant Examiner—Erma Cameron
Attorney, Agent, or Firm—Walter A. Hackler

[57] ABSTRACT

A method for treating hydrophilic and rigid gas permeable contact lenses, as well as the manufacture of protein adhesion resistant and gas permeable enhanced lenses, is obtained through purging the hydrated contact lens, formed from polymer comprising hydrogen atoms, substantially all water and oxygen, and thereafter exposing the purged contact lens to a fluorine-containing gas in non-plasma conditions for a period of time and at a temperature sufficient to replace hydrogen atoms in the polymer in order to inhibit protein deposits on the contact lens. The conditions of fluorine exposure can be controlled in order to provide a gas permeable enhanced contact lens.

20 Claims, 1 Drawing Sheet

CHEMICAL TREATMENT TO IMPROVE OXYGEN PERMEABILITY THROUGH AND PROTEIN DEPOSITION ON HYDROPHILIC (SOFT) AND RIGID GAS PERMEABLE (RGP) CONTACT LENSES

Extended wear contact lenses such as hydrophilic (soft) and rigid gas permeable (RGP) contact lenses have been a major development in vision care. Conventional hydrophilic soft lenses are primarily hydrogels derived from a variety of hydrophilic monomers or polymers, which have either been cross-linked or insolubilized in water by some mechanism, such as by the introduction of crystallinity or by varying hydrophobic/hydrophilic properties.

Rigid gas permeable contact lenses have been prepared from many compounds, including siloxanyl alkyl methacrylates or fluoromethacrylates, usually in "polymerization" with other monomers to improve hardness, refractive index, and wettability. Typically, the rigid gas permeable contact lenses normally provide greater visual acuity than hydrogel lenses; however, such lenses do not have the inherent comfort of a soft hydrogel lens.

However, both hydrophilic soft and rigid gas permeable contact lenses develop extensive deposit formation on the lens surfaces by denatured proteins, mucopolysaccharides, lipids, phospholipids, cholesterol, insolubilized calcium salts, etc. In fact, extended wear lenses tend to have a greater build-up of proteins than traditional daily wear lenses, which have a lower water of hydration.

A further complication to the combination of the build-up of deposits is the fact that to achieve a high oxygen permeability, extended wear lenses are typically made thin, which significantly reduces their tear strength. Consequently, if an extended wear soft lens becomes covered with surface deposits, the lens must be removed and cleaned. This repeated cleaning, in combination with a thin lens, ultimately leads to lens fatigue and tearing. Furthermore, extended soft wear soft lenses have deposits which, in many instances, are not possible to remove.

It has been recognized that polymeric materials having improved surface properties may be obtained by coating the polymeric lens substrate with a fluorocarbon polymer to produce a rigid, low-energy surface that will significantly reduce adhesion thereto. (See U.S. Pat. No. 5,091,204.) This patent teaches the surface modification of a polymethyl methacrylate by plasma deposition of a gaseous fluorocarbon monomer in order to reduce cell adhesion and damage to corneal endothelial tissues upon implantation of the intraocular lens. This process, however, is directed to implantable intraocular lenses and not suited to hydrogels which are soft and easily damaged.

Functional group, such as fluorine, have been introduced to polymer surfaces using a number of techniques. These techniques include the LaMar process in which a polymer surface is immersed in a reactor filled with an inert atmosphere, such as helium. Ultra-pure fluorine gas is then slowly introduced into the inert atmosphere at a very low initial concentration. The fluorine concentration is then raised gradually, and temperature is maintained at a uniform low temperature so as to avoid uncontrolled fluoridization. This process is used in U.S. Pat. No. 4,144,374 and further disclosed in: R. J. Lagow and L. L. Margreave, "Direct Fluoridization of Organic and Inorganic Substances," *Proc. Natl. Acad. Sci.*, 64, 4, 8A (1970), among other references.

Another approach to reducing surface adhesion and increasing oxygen permeability has been to incorporate the fluorine into the polymer during polymerization. A summary of such techniques is set forth in U.S. Pat. No. 4,990,582. However, such fluoropolymer lenses typically encounter machining and manufacturing problems and, as summarized in U.S. Pat. No. 4,990,582, no previous work has resulted in a successful hydrogel lens having high oxygen permeability, a high water hydration, and a high resistance to surface deposits.

The method of the present invention produces a protein deposition resistant hydrogel or rigid gas permeable lens from a non-fluoropolymer lens material at low cost through a fluorochemical treatment of the lens surface.

SUMMARY OF THE INVENTION

In accordance with the present invention, a method for treating hydrophilic and rigid gas permeable lenses includes the purging of a hydrated contact lens, formed from a polymer comprising hydrogen atoms, of substantially all water and oxygen and exposing the lens to fluorine gas. The fluorine rapidly reacts with active functional groups in the polymer network of the desiccated lens.

If just the surface of the lens is reactive with fluorine, then a self-lubricating low adhesive surface is formed. The method preferably includes the step of exposing a desiccated lens to a fluorine-containing gas having a fluorine concentration of between about one and about ten percent, the remainder of the fluorine-containing gas comprising helium.

Further, in accordance with the present invention, if the purged, or desiccated, contact lens is exposed to the fluorine gas for a longer period of time, the oxygen permeability, or transmissibility, of the lens will increase because of the high affinity between the substituted fluorine atoms and oxygen. In this embodiment, the lenses are exposed in order to enable fluorine penetration of the lens surface to a depth that can impart unique surface and bulk properties to biological devices and materials such as contact lenses, intraocular lenses, prosthetic devices, support matrices, etc.

More particularly, in accordance with the method of the present invention, the polymer may be comprised of a fluorosilicone acrylate, Polymacon, Surfilcon A, Bufilcon A, or Methafilcon B. As reported in the 1993 Edition of the United States Adopted Names (USAN) and the USP Dictionary of Drug names Polymacon is Poly (2-hydroxyethyl methacrylate), Surfilcon A is 1-Vinyl-2-pyrrolidinone polymer with methyl methacrylate and allyl methacrylate, Bufilcon A is 2-Hydroxyethyl methacrylate polymer with N-(1,1-dimethyl-3-oxobutyl) acrylamide and 2-ethyl-2-(hydroxymethyl)-1,3-propanediol trimethacrylate, and Methafilcon B is hydroxyethyl methacrylate polymer with methacrylic acid, ethylene dimethacrylate and 2-(2-hydroxyethoxy) ethyl methacrylate. In addition, the present invention includes contact lenses made by the method of the present invention.

BRIEF DESCRIPTION OF THE DRAWINGS

The advantages and features of the present invention will be better understood by the following description when considered in conjunction with the accompanying drawings in which.

DETAILED DESCRIPTION

Figure 1:
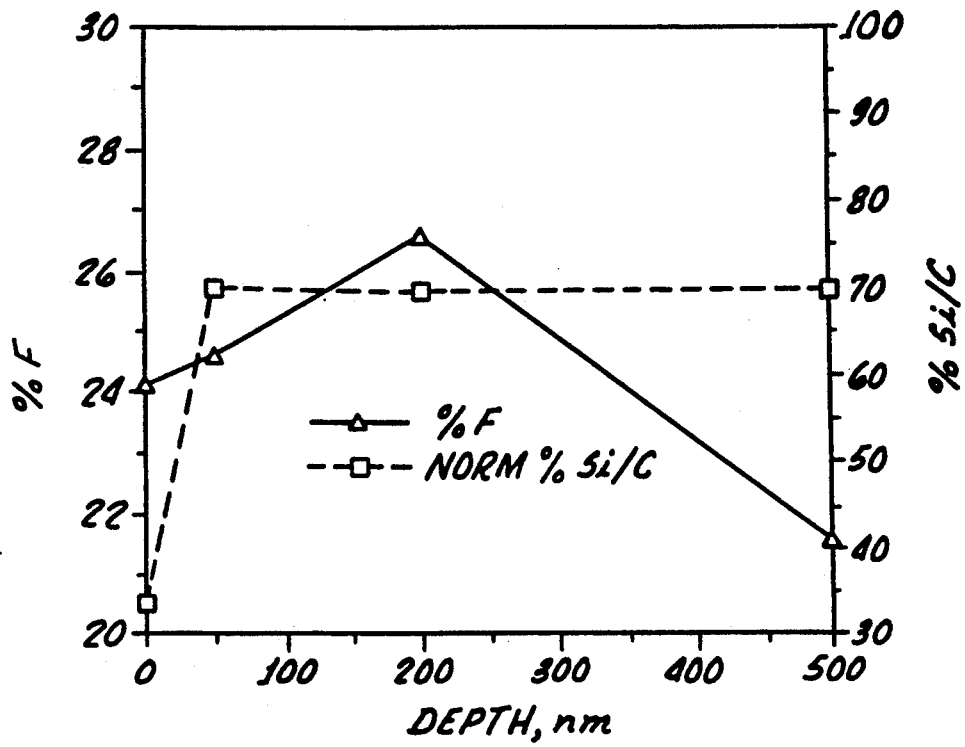
FIG. 1 is an elemental profile of Fluoroperm 92.

The method, in accordance with the present invention, incorporates LaMar techniques, which include purging of the sample of all water and oxygen before exposing it to fluorine gas which has been diluted with an inert gas, such as helium.

The temperature and heat of reaction are controlled by ramping the $F_2$ concentration from 0 (100% inert gas) to some fixed percentage, typically 1 to 10%. This prevents cross-linking or burning of the polymer material, which would otherwise occur if pure $F_2$ were used. In this process, hydrogen atoms in the polymer are replaced by fluorine at the surface with a depth of penetration dependent upon the temperature, concentration of fluorine, and the time of exposure.

The reaction of fluorine with the polymer network imparts a number of very unique and useful properties to the lens. As hereinbefore set forth, if just the surface of the lens is reacted with fluorine (for example, less than about 1 micrometer), then a self-lubricating, low adhesion surface is formed; and this nonstick surface will help to prevent protein build-up hereinabove identified. When the fluorine gas is allowed to penetrate deeper than just the surface, then at least two changes will occur in the bulk properties of the polymer network. First, the water content of the swollen lens will decrease because of the very hydrophobic nature of the fluorine atoms. Second, the oxygen transmissibility of the lens will increase because of the high affinity between fluorine and oxygen. These two factors will combine to improve the ocular health of contact lens wearers. Further, the contact lens will be less prone to desiccation during extended wear because of the lower water content in the treated lens and the higher oxygen transmissibility will help prevent oxygen deprivation of the sensitive corneal tissue.

As shown in the hereinafter presented examples, the results are highly dependent upon the type of polymer used and therefore conditions may necessarily be changed in order to optimize the method of the present invention for each polymer type.

In general, the gas permeable lenses were found to be the most reactive with fluorine gas, requiring only about one percent of fluorine to obtain twenty to twenty-five percent substitution at the surface. Hydrogel lenses showed similar degrees of substitution after exposure to ten percent fluorine, although the depth of penetration was not as great.

It should be noted that the PMMA intraocular lenses (IOL) do not incorporate any fluorine under the conditions employed, but under more extreme fluorination conditions, these materials have also been shown to be successfully surface fluorinated.

While contact lenses under the method of the present invention showed improved wettability as measured by the contact angle and those lenses which initially tended to absorb protein in vitro showed a reduced rate of protein uptake after fluoridization.

As set forth in the examples, the optical properties of the lenses were minimally affected and hence, the surface characteristics of the lens have been substantially improved without significantly affecting the bulk properties, such as optical properties, physical dimensions and flexibility.

As hereinabove pointed out, oxygen transmissibility, or permeability, of the contact lenses can be increased by treating the entire lens, not just the surface, by changing exposure conditions. Thus, if the reaction temperature is lowered to slow down the reaction rate between the fluorine and the polymer network, the fluorine gas is allowed to diffuse further into the polymer matrix before reacting with the matrix. Any treatment procedure, in accordance with the present invention, which may cause changes in the power and base curvature of the lens, due to changes in the water content, can be compensated for by the initial manufacturing process of the lens.

The perfluorination, in accordance with the present invention, with already manufactured lenses circumvents the manufacturing and machining problems that are commonly encountered with fluoropolymer lenses, and consequently, the cost of the resultant lens, produced by fluorine treatment, is significantly less.

EXAMPLES

Sample Description/Preparation

The sample contact lens must be free of water and oxygen when exposed to fluorine, otherwise cross-liking reactions will occur which would result in undesirable physical properties. When possible, samples were used which had never before been hydrated. However, in some cases, it was necessary to remove the water by the process of lyophilization (freeze-drying). In this manner, the original shape and porosity of the hydrogel lenses could be maintained. Salts, mainly sodium chloride, were first removed by soaking in deionized water for several hours, with several changes of the wash water during this time. Hydrogel lenses were supported in plastic cases in water and frozen in blocks of ice. The ice was sublimed away at $-10°$ C. over several days in a vacuum. Uncut silicone acrylate and polymethacrylate lenses were sent in the same type of cage used for the hydrogels.

TABLE 1

| | | Description of Contact Lenses Tested | | | |
|---|---|---|---|---|---|
| Lens Type | FDA Group | Description | Polymer Name | % Water | Monomers |
| Boston II | RGP | Gas-Permeable | Pasifocon B | 0 | Silicone Acrylate |
| Fluoroperm 30 | RGP | Gas-Permeable | Fluorosilicone Acrylate | 0 | Low Fluorine Silicone Acrylate |
| Fluoroperm 92 | RGP | Gas-Permeable | Fluorosilicone Acrylate | 0 | High Fluorine Silicone Acrylate |
| Hydron Zero 6 | I | Low Water, | Polymacon | 38 | HEMA |

TABLE 1-continued

Description of Contact Lenses Tested

| Lens Type | FDA Group | Description | Polymer Name | % Water | Monomers |
|---|---|---|---|---|---|
| Permaflex | II | Non-Ionic High Water, Non-Ionic | Surfilcon A | 74 | VP, MMA, AMA |
| Softmate | III | Low Water, Ionic | Bufilcon A | 45 | HEMA, DAA, TMPTA |
| Hydrasoft XW | IV | High Water, Ionic | Methafilcon | 55 | MA, Acrylamide |

KEY:
HEMA = hydroxyethyl methacrylate
VP = vinyl pyrrolidone
MMA = methyl methacrylate
AMA = allyl methacrylate
MA = methacrylic acid
DAA = diacetone acrylamide
TMPTA = trimethylolpropane trimethacrylate First, samples were fluorinated using $F_2$ at a concentration of 1%. The silicone-containing RGP lenses all incorporated significant amounts of fluorine, whereas, out of the four types of hydrogel lenses tested, only the Softmate lens (FDA type III) had a measurable amount of fluorine (1.8%) by Auger analysis (see Table 2). The other lenses did, however, show a decrease in the oxygen to carbon ratio at the surface of the hydrogel lens. The lenses were treated again with 1% $F_2$. Again, the Softmate was the only lens containing fluorine, this time at 7.7%. Of the other lenses, only the Type I (Hydron Zero 6) showed any change in composition and an additional decrease in the oxygen-to-carbon ratio.

Elemental Analysis of Surface

The fluorinated contact lenses were analyzed by measuring the elemental composition of the sample surface to a depth of a few Angström units (see Table 2). All chemical elements are detected with the exception of hydrogen. On samples showing surface fluorine, an argon beam was used to sputter off layers of polymer to allow analysis at various depths below the surface (up to 50 nm). The percentage of fluorine and its depth of penetration was found to vary significantly, depending on the material, with the gas permeable lenses showing the highest degree of fluorine substitution. In the fluorine-containing Fluoroperm 30 and 92 (Fluorosilicone Acrylate) lenses, the depth of penetration may be as high as 1 μm. Fluorine substitution appeared to decrease exponentially with depth. It was found that the silicon-to-carbon ratio decreased in these lenses, apparently as a result of volatilization of the silicone in the polymer due to reaction with fluorine. The percent additional fluorine found above the initial percentage at a given depth is approximately the same for the three RGP types.

FIG. 1 shows how, in the FP 92 RGP lens, the atom percent of fluorine increases with depth to about 27% at 200 nm below the surface and then begins to decrease. Since the precision of argon sputtering decreases with depth, it was not practical to reach a depth at which percent fluorine reaches control levels (15%). The Si/C ratio is at a minimum of 20% of control at the surface, rising to 70% at 500 nm. It is notable that the ratio holds constant between 50 and 500 nm rather than increasing steadily with depth as one would expect.

As can be seen from Table 3, acrylic-based hydrogel lenses are much more resistant to fluorine gas than the gas permeable types. This is not surprising since the gas permeability of desiccated hydrogel lenses is relatively low in comparison. A second batch of hydrogel lenses was prepared and treated with 10% fluorine gas.

TABLE 2

Results for Lenses Exposed Twice to 1% Fluorine

| Lens | Depth, nm | % Fluorine | Si/C Ratio | Si/C Norm % |
|---|---|---|---|---|
| Boston II | Control | 0 | 0.1 | 100 |
| | 0 | 21 | 0.052 | |
| | 25 | 11.3 | 0.13 | |
| | 50 | 11.1 | 0.1 | |
| Fluoroperm 30 (FP 30) | Control | 6 | 0.04 | 100 |
| | 0 | 26 | 0.04 | 175 |
| | 25 | 19 | 0.06 | 173 |
| | 50 | 20 | 0.07 | 164 |
| | 100 | 20 | 0.07 | 180 |
| | 200 | 19 | 0.08 | 205 |
| | 500 | 15 | 0.07 | 183 |
| Fluorperm 92 (FP 92) | Control | 13 | 0.12 | 100 |
| | 0 | 24 | 0.041 | 33 |
| | 50 | 25 | 0.076 | 70 |
| | 200 | 27 | 0.084 | 69 |
| | 500 | 22 | 0.084 | 70 |
| Hydron Z 6 (Type I) | Control | 0 | NA | |
| | 0 | 0 | NA | |
| | 25 | 0 | NA | |
| Permaflex (Type II) | Control | 0 | NA | |
| | 0 | 0 | NA | |
| Softmate (Type III) | Control | 0 | NA | |
| | 0 | 7.7 | NA | |
| Hydrasoft (Type IV) | Control | 0 | NA | |
| | 0 | 0 | NA | |

After such exposure, all the hydrogel lenses had significant amounts of fluorine on their surfaces. The Hydrasoft lenses had the highest level of surface fluorination for the four lens types (17.2%), but the profile for fluorination was much shallower than for the Zero 6 and Permaflex lenses. In fact, there was still a significant level (1.8%) of fluorine at a depth of 20 nm for the Permaflex lens. If the lenses are ranked according to depth of fluorine penetration, when exposed to 10% fluorine gas, then the order would be: Permaflex > Zero 6 > Hydrasoft > Softmate.

TABLE 3

Results for Lenses Exposed to 10% Fluorine

| Lens | Depth, nm | % Fluorine | % Carbon |
|---|---|---|---|
| Zero 6 (I) | 0 | 11.6 | 79.5 |
| | 2 | 3.6 | 87.7 |
| | 10 | 2.8 | 83.0 |
| Permaflex (II) | 0 | 9.5 | 81.4 |
| | 2 | 3.0 | 88.6 |
| | 4 | 3.4 | 89.0 |
| | 10 | 2.8 | 90.8 |
| | 20 | 1.8 | 92.3 |

TABLE 3-continued

| Results for Lenses Exposed to 10% Fluorine | | | |
|---|---|---|---|
| Lens | Depth, nm | % Fluorine | % Carbon |
| Softmate (III) | 0 | 4.5 | 89.1 |
|  | 2 | 4.3 | 76.6 |
|  | 4 | 0 | 82.5 |
| Hydrasoft (IV) | 0 | 17.2 | 75.4 |
|  | 2 | 3.3 | 92.9 |
|  | 4 | 1.8 | 94.6 |

Contact Angle Measurements

One requirement for comfortable contact lens wear is a stable tear film. A surface which is easily wetted prolongs the time before tear film breakup. The contact angle between water in the tear film and the surface of the contact lens is a measure of the ease of wetting and is often an indicator for lens comfort. It was presumed that surface fluorination would make these contact lenses have a teflon-like surface, that is, non-wettable. However, the opposite was the case. For every lens tested, the fluorinated lens had a smaller contact angle than the corresponding control. These results were quite unexpected. Contact angles for the RGP lenses were determined using a laser goniometer device. This instrument was found to reduce eye strain and to remove some of the subjectivity from the measurement. Contact angles for the hydrogel lenses were determined using the captive bubble method on the conventional goniometer. The results of these tests are shown in Table 4.

TABLE 4

| Contact Angles for Fluorinated Contact Lens Surfaces | | | |
|---|---|---|---|
|  | Percent | Contact Angle (Degrees) | | % |
| Lens | F | Control | Fluorinated | Change |
| Boston II | 1% | 81 | 63 | −23 |
| Fluoroperm 30 | 1% | 69 | 73 | +6 |
| Fluoroperm 92 | 1% | 98 | 68 | −31 |
| Zero 6 | 10% | 29.0 ± 2.0 | 13.6 ± 0.5 | −53 |
| Permaflex | 10% | 17.3 ± 0.1 | 11.6 ± 0.4 | −33 |
| Softmate | 10% | 18.8 | 13.8 ± 1.1 | −27 |
| Hydrasoft | 10% | 25.4 | 15.4 ± 2.0 | −39 |

The Fluoroperm (FP 92) showed a large decrease in contact angle (−31%) compared to the FP 30 (+6%). The FP 92 is made with a higher percentage of silicone, which accounts for its very high oxygen permeability, but it also makes the lens more hydrophobic and prone to lipid deposition. As can be seen in Table 2, both types of Fluoroperm lenses have the same S/C ratio of 0.04 following fluorination. This correlates with the fact that both have the same contact angle of about 70 degrees after fluorination. By significantly reducing the contact angles for the RGP's, it would be expected that the fluorinated lenses would be more comfortable than the untreated lenses.

It is well-documented that the more hydrophobic RGP's, with high silicone content, are prone to rapidly acquire lipid deposits which eventually affect lens comfort and wearability. If contact angle is any indication, fluorination should decrease the tendency of lipid to bind to the surface of contact lenses. Therefore, this teflon-like surface may prevent deposit formation while at the same time improve patient comfort.

Even more dramatic changes were evidenced with the hydrophilic lenses. The Zero 6 lenses had as much as a 53% decrease in contact angle. These rather startling results were probably due to an increased affinity for oxygen and nitrogen molecules on the fluorine-treated surface which resulted in smaller contact angles.

In Vitro Protein Deposition

A lysozyme binding study was performed on the hydrophilic lenses which had been exposed to 10% fluorine gas to determine if surface fluorination had an effect on protein deposition. The lenses were exposed to lysozyme in buffered saline and incubated at 35° C. in an environmental chamber. The UV absorbance at 280 nm was measured at various time points over a period of four days. In this way, both equilibrium and kinetic factors could be studied. The results are shown in Table 5. Consistent with previous reports, the Type I lens adsorbed very little, if any, protein, the Type III, an insignificant amount. In the Type IV, both test and control absorbed the same amount of protein, but the test lens took twice as long to reach equilibrium. Surprisingly, the Type II lenses showed greater absorbance in the test lenses than in the control lenses. This may be because these lenses were overexposed to fluorine: the Type II appeared yellow and hazy. After the last absorbance reading was taken (140 hrs.), the lenses were cleaned using Lens Plus cleaning solution by rubbing for 30 seconds between gloved fingers. None of the lenses showed a significant decrease in the absorbance at 280 nm upon cleaning. This indicates that the Type II absorbance was probably due to a chemical reaction rather than protein uptake. The fact that the absorbance of the Type IV lenses did not change after using the cleaning solution shows that the protein is distributed within the matrix of the lens rather than on the surface.

Figure 2:
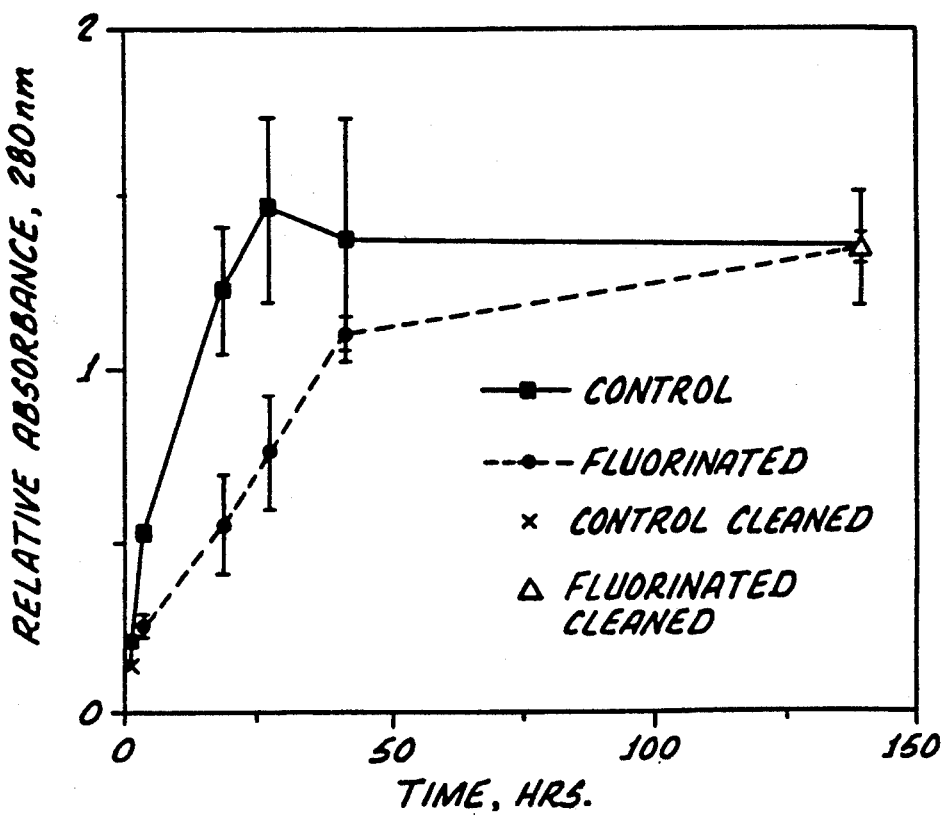
FIG. 2 shows the protein (Lysozyme) absorption in Type IV (Hydrosoft XW) contact lenses.

In FIG. 2, lysozyme uptake is compared between control and fluorinated high-water, ionic (Type IV) lenses. Treatment with fluorine significantly reduced the rate of uptake, but the total uptake at 140 hours was not significantly affected. As the error bars indicate this reduction is significant until about 42 hours exposure time. It is anticipated that these in vitro results may translate into longer wearability for these lenses due to the reduced protein deposition rate.

TABLE 5

| Relative UV Absorbance of Contact Lenses at 280 nm | | | | | | | | |
|---|---|---|---|---|---|---|---|---|
| Lens | Initial | 1 hr | 3 hr | 18 hr | 27 hr | 42 hr | 140 hr | Cleaned |
| I control | 0.00 | ND | ND | −0.03 | ND | ND | −0.04 | ND |
| I fluor | 0.00 | ND | ND | −0.04 | ND | ND | −0.03 | ND |
| II control | 0.00 | ND | ND | 0.01 | ND | ND | 0.01 | ND |
| II fluor | 0.00 | ND | ND | 0.13 | ND | ND | 0.49 | 0.41 |
| III control | 0.00 | ND | ND | −0.05 | ND | ND | −0.04 | ND |
| III fluor | 0.00 | ND | ND | 0.01 | ND | ND | 0.01 | ND |
| IV control | 0.00 | 0.22 | 0.52 | 1.23 | 1.42 | 1.38 | 1.34 | 1.31 |
| IV fluor | 0.00 | 0.14 | 0.26 | 0.55 | 0.76 | 1.08 | 1.33 | 1.35 |

ND = Not Done

Optical Evaluation

Since hydrogel lenses are flexible and contain a high percentage of water, chemical modification can potentially affect the lens shape and its optical properties. The optical properties of two lenses from each type were evaluated after fluorination. Some lenses could not be measured because they were transparent to the measuring beam. As a general observation, power decreased slightly in the non-ionic lenses, whereas it increased slightly in the ionic lenses. Base curve, when it could be measured, was marginally lower for all lenses. Lens diameter decreased significantly in the Type IV lenses. The gross color and shape observations were made with the naked eye against a white background.

TABLE 6
Optical Parameters of Lenses

| Sample # | Sagittal Height | Base Curve | Power | Diameter (mm) | Observations |
|---|---|---|---|---|---|
| I D | 1.57 | 8.48 | −2.50 | 14.01 | sl. yel. edges |
| I E | 1.57 | 8.49 | −2.50 | 14.11 | sl. yel. edges |
| I control | NM | 8.7 | −2.75 | 14.0 | clear |
| II C | NR | NC | −2.87 | 14.67 | y. yel. |
| II D | NR | NC | −3.00 | 14.61 | v. yel. |
| II control | NM | 8.7 | −3.0 | 14.4 | clear |
| III C | 1.62 | 8.20 | −3.25 | 14.17 | sl. yecontroll. |
| III D | 1.62 | 8.24 | −3.12 | 14.30 | sl. yel. |
| III control | NM | 8.7 | −3.0 | 14.3 | clear |
| IV E | 1.81 | 7.43 | −3.12 | 13.11 | sl. yel., film-edge |
| IV F | 1.83 | 7.33 | −3.37 | 13.03 | sl. yel., film-edge |
| IV control | NM | 8.6 | −3.0 | 14.2 | clear |

NR = Not Readable (by instrument)
NM = Not Measured
NC = Not calculable

Although there has been hereinabove described a method and a chemical treatment to improve oxygen permeability through and reduce deposition on hydrophilic (soft) and rigid gas permeable (RGP) contact lenses in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for treating hydrophilic and rigid gas permeable contact lenses, said method comprising:
   purging a hydrated contact lens, formed from a polymer comprising hydrogen atoms, of substantially all water and oxygen; and
   exposing the purged contact lens to a fluorine-containing gas at non-plasma conditions for a period of time and at a temperature sufficient to replace hydrogen atoms in the polymer in order to inhibit protein and lipid deposits on said contact lens.

2. The method according to claim 1 wherein the step of exposing the lens to fluorine-containing gas enables fluorine penetration of a contact lens surface to a depth of at most about 1 micrometer.

3. The method according to claim 1 wherein the step of exposing the lens to fluorine-containing gas is a period of time sufficient to increase oxygen permeability of the contact lens.

4. The method according to claim 3 wherein the step of exposing the lens to fluorine-containing gas enables fluorine penetration of a contact lens surface to a depth greater than about 1 micrometer.

5. The method according to claim 1 wherein the lens is exposed to a fluorine-containing gas having a fluorine concentration between about 0.001 and about 30 percent.

6. The method according to claim 5 wherein the fluorine-containing gas further comprises helium.

7. The method according to claim 2 wherein up to about 25 percent of the hydrogen atoms in the 1 micrometer depth are replaced by fluorine atoms.

8. A method for treating hydrophilic and rigid gas permeable contact lenses, said method comprising:
   purging a hydrated contact lens, formed from a polymer comprising hydrogen atoms, of substantially all water and oxygen; and
   exposing the purged contact lens to a fluorine-containing gas at non-plasma conditions for a period of time and at a temperature sufficient to replace hydrogen atoms in the polymer in order to improve wettability of the contact lens.

9. A method for treating hydrophilic and rigid gas permeable contact lenses, said method comprising:
   purging a hydrated contact lens, formed from a polymer comprising hydrogen atoms, of substantially all water and oxygen; and
   exposing the purged contact lens to a fluorine-containing gas at non-plasma conditions for a period of time and at a temperature sufficient to replace hydrogen atoms in the polymer in order to increase oxygen permeability of the contact lens.

10. The method according to claim 9 wherein the step of exposing the lens to fluorine-containing gas enables fluorine penetration of a contact lens surface to a depth greater than about 1 micrometer.

11. The method according to claim 9 wherein the lens is exposed to a fluorine-containing gas having a fluorine concentration between about 0.001 and about 30 percent.

12. The method according to claim 11 wherein the fluorine-containing gas further comprises helium.

13. A method for treating unhydrated hydrophilic and rigid gas permeable contact lenses formed from a polymer comprising hydrogen atoms, said method comprising exposure of the unhydrated lens to fluorine gas at non-plasma conditions for a period of time and at a temperature sufficient to replace hydrogen atoms in the polymer in order to inhibit protein and lipid deposition on said contact lenses.

14. A method for treating unhydrated hydrophilic and rigid gas permeable contact lens formed from a polymer comprising hydrogen atoms, said method comprising exposing the unhydrated lens to fluorine gas at non-plasma conditions to replace hydrogen atoms in the polymer in order to increase oxygen permeability of the contact lens.

15. The method according to any one of claims 1, 9, 13 and 14 wherein the polymer comprises silicone acrylate.

16. The method according to any one of claims 1, 9, 13 and 14 wherein the polymer comprises fluorosilicone acrylate.

17. The method according to any one of claims 1, 9, 13 and 14 wherein the polymer comprises POLYMACON.

18. The method according to any one of claims 1, 9, 13 and 14 wherein the polymer comprises SURFILCON A.

19. The method according to any one of claims 1, 9, 13 and 14 wherein the polymer comprises BUFILCON A.

20. The method according to any one of claims 1, 9, 13 and 14 wherein the polymer comprises METHAFILCON B.

* * * * *